United States Patent [19]
Siddiqui et al.

[11] Patent Number: 5,633,080
[45] Date of Patent: May 27, 1997

[54] POLYESTER FILMS CONTAINING GLASS SPHERES AND CALCINED CHINA CLAY

[75] Inventors: Junaid A. Siddiqui, Richmond, Va.; Paul D. A. Mills, Darlington, England

[73] Assignees: Imperial Chemical Industries PLC, United Kingdom; ICI Americas Inc.

[21] Appl. No.: 465,398

[22] Filed: Jun. 5, 1995

Related U.S. Application Data

[63] Continuation of Ser. No. 93,241, Jul. 16, 1993, abandoned.

[51] Int. Cl.$^6$ ......................................................... B32B 5/16
[52] U.S. Cl. ......................... 428/325; 428/331; 428/480
[58] Field of Search ....................................... 428/323, 325, 428/331, 480

[56] References Cited

U.S. PATENT DOCUMENTS

| | | | |
|---|---|---|---|
| 4,692,480 | 9/1987 | Takahashi et al. | 523/218 |
| 4,990,400 | 2/1991 | Endo et al. | 428/331 |
| 5,128,205 | 7/1992 | Butler | 428/331 |
| 5,132,356 | 7/1992 | Siddiqui | 524/493 |
| 5,137,939 | 8/1992 | Siddiqui | 524/493 |

FOREIGN PATENT DOCUMENTS

| | | |
|---|---|---|
| 0 491 504 A2 | 6/1992 | European Pat. Off. . |
| 0 514 129 A2 | 11/1992 | European Pat. Off. . |
| 0 532 172 A1 | 3/1993 | European Pat. Off. . |

OTHER PUBLICATIONS

Katz, H. S. et al.: "Handbook of Fillers for Plastics" 1987, Van Nostrand Reinhold Company, New York, pp. 143–155.

*Primary Examiner*—Hoa T. Le

[57] ABSTRACT

The present invention relates to films or sheets of linear polyester having incorporated therein a combination of glass spheres and calcined clay having certain particle sizes and present in specific amounts based upon the weight of the polyester film. The addition of these fillers improves several properties of the film, including the handleability while maintaining acceptable optical clarity and transparency and to the method of making such films or sheets.

15 Claims, No Drawings

POLYESTER FILMS CONTAINING GLASS SPHERES AND CALCINED CHINA CLAY

This application is a continuation of U.S. application Ser. No. 08/093,241, filed Jul. 16, 1993 now abandoned.

This invention relates to a polymeric film, and in particular to a polymeric film having a combination of fillers therein and to a method of making such film.

Films or sheets of linear polyester have been commercially available for many years. The polymeric film has excellent draw orientation and has proved to be especially well suited for the biaxial film orientation process resulting in films of outstanding properties. Polymeric film also known as polyethylene terephthalate or PET is strong and has excellent inherent chemical and thermal stability properties. The polymer preparation and film manufacturing processes are well known to those skilled in the art and are recited in many texts, including the Encyclopedia of Polymer Science and Engineering, second edition, volume 12, by John Wiley and Sons, Inc., pages 1 through 313; and numerous U.S. and foreign patents.

It is known that polymeric films often have poor handling properties which may result in difficulties in winding the films into high quality reels and inefficient passage through processing equipment, for example, slitting machines. Film handling properties can be improved by increasing the surface roughness of the film, suitably by the use of coatings, or alternatively by incorporating fillers, i.e. organic or inorganic particles into the film. A combination of coatings and fillers may be used to improve film handling properties. The problem with using coatings to improve film handleability is that they limit the range of uses in which the film may be employed because of the difficulty in applying additional coating layers which may be required, for example, to provide antistatic, adhesion promoting or release properties.

A wide range of fillers have been incorporated into films to improve the handling properties such as: the glass spheres and fumed silica described in U.S. Pat. Nos. 5,132,356 and 5,137,939; and the inorganic materials taught in U.S. Pat. No. 4,274,025 which include synthetic silica, calcium borate, calcium carbonate, magnesium carbonate, barium sulphate, calcium or aluminum silicate and glass spheres. Notwithstanding the improvements these fillers provide, the films containing such fillers are typically restricted to particular uses.

The incorporation of minute particle fillers into films presents a number of problems particularly during the processing of the polymer. It is typically desirable to incorporate the fillers into the resin system prior to the polymerization. However, this requires subjecting the fillers to the polymerization reaction and associated reaction conditions which presents additional filler considerations. The process conditions such as heat, time, agitation and pressure necessary to complete the polymerization may cause the fillers to react, decompose, agglomerate, etc. Accordingly, the processing characteristics of the fillers can present numerous processing problems.

Optical clarity and transparency are important criteria in a wide range of film applications, such as packaging, metallized films, reprographic films and films for general industrial use. There is a continuing need for films exhibiting high light transmittance, low haze and excellent handling properties and for fillers that are more universal in their areas of use and processability.

The present invention surprisingly overcomes or substantially reduces one or more of the aforementioned problems.

Accordingly, the present invention provides a polyester film that has excellent handling properties, including improved anti-blocking, and reduced creasing, pimpling and machine-direction (MD) wrinkles.

Another aspect of the present invention is to provide a polyester film that not only has excellent handling properties but also has low haze, and good optical clarity.

A still further aspect of the present invention is to provide a polyester film incorporating a combination of fillers that have good processing characteristics.

Another aspect of the present invention is to provide a polyester film incorporating a combination of fillers that do not react, decompose, or agglomerate when subjected to the polymerization reaction and reaction conditions.

SUMMARY OF THE INVENTION

The present invention relates to films or sheets of linear polyester having incorporated therein a combination of glass spheres and calcined clay having certain particle sizes and present in specific amounts based upon the weight of the polyester film. The addition of these fillers improves several properties of the film, including the handleability while maintaining acceptable optical clarity and transparency and to the method of making such films or sheets.

DETAILED DESCRIPTION OF THE INVENTION

The present invention relates to a polyester film comprising a polyester polymer having incorporated therein a combination of (a) glass spheres having an average particle size of between 1 and 8 microns present in an amount ranging between 25 ppm and 350 ppm by weight based on the weight of the polymer and (b) calcined clay present in an amount not exceeding 10,000 ppm by weight based on the weight of the polymer.

The glass spheres that are useful in the practice of the invention are solid glass spheres and are not limited to any chemical composition and they can have either a smooth surface or an etched surface. The surface can be etched by contacting the glass spheres with nitric acid for a time sufficient to give the desired degree of etching of the surface. The glass spheres are substantially spherical in shape with the average particle size in microns referring to the diameter of about fifty percent or more of the particles in a given sample, as measured by a conventional particle size analyzer. Preferred glass spheres are sold under the tradename SPHERIGLASS, by Potters Industries Inc., an affiliate of the PQ Corporation.

The glass spheres incorporated into the film of the present invention typically have an average particle size of between 2 and 5.2 microns, more typically 2 to 4 microns in diameter. The glass spheres are present in a small amount that ranges between 25 ppm and 350 ppm, preferably the amount of glass spheres ranges between 50 ppm and 300 ppm, most preferably the amount ranges between 100 and 300 ppm, by weight based on the weight of the polymer.

The calcined clay useful in the present invention may be formed by the conventional processing of hydrous clay. One general method of forming calcined clay is as follows: first dry milling the hydrous clay, followed by air classification and purification, then calcinating the clay by subjecting it to at least 1000° C. and further processing it by sand milling in water and finally forming an ethylene glycol slurry by removing the water by azeotropic distillation.

A given sample of calcined clay has an average particle size in microns which refers to the size of about fifty percent or more of the particles in such sample, as measured by a conventional particle size analyzer. The calcined clay of the present invention has an average particle size of less than 1 micron, preferably less than 0.85 microns, most preferably between 0.25 and 0.75 microns. The calcined clay may be introduced into the polymer in an ethylene glycol slurry comprising up to 55% solids, typically 50% solids, by weight based upon the total weight of the slurry. A preferred slurry of calcined clay is sold by English China Clay International, under the tradename InFilm 3117, having an average particle size of 0.3 microns, as measured by a Microtrac Model II—Particle Size Analyzer and a particle size distribution of 98% below 2 microns and 90% below 0.5 microns.

The calcined clay is present in the polyester film in an amount not exceeding 10,000 ppm, typically not exceeding 8,000 ppm, preferably in a range between 1000 and 5000 ppm, by weight based on the weight of the polymer in the polyester film.

The required quantities of glass spheres and calcined clay can be added to the polyester film forming material at any point in the film manufacturing process prior to the extrusion of the polymer. In the general practice of this invention, it is preferred to incorporate the glass spheres and calcined clay particles into the polyester during its production by polymerization. A convenient procedure is to add the particles to the polycondensation mixture used for the production of the polyester. It has been found particularly desirable to add the glass spheres and calcined clay during the manufacture of the polyester polymer as a slurry after the ester interchange reaction in which monomers are formed. The particles can, for example, be added as a slurry in the glycol from which the polyester is formed prior to the commencement of the polycondensation.

The polymer useful in the manufacture of the film of the invention is well known to those skilled in the art and may be obtained from any film-forming, polymeric material. Synthetic linear polyester polymers; which may be obtained by condensing one or more dicarboxylic acids or their lower alkyl (up to 6 carbon atoms) diesters, e.g., terephthalic acid, isophthalic acid, phthalic acid, 2,5-, 2,6- or 2,7- naphthalene dicarboxylic acid, succinic acid, sebacic acid, adipic acid, azelaic acid, 4,4'-diphenyl-dicarboxylic acid, hexahydroterephthalic acid or 1,2-bis-p-carboxy-phenoxyethane (optionally with a monocarboxylic acid, such as pivalic acid) with one or more glycols, e.g., ethylene glycol, 1,3-propanediol, 1,4-butanediol, neopentyl glycol and 1,4-cyclohexane-dimethanol; have been found particularly effective in forming films of the present invention. A polyethylene terephthalate film is particularly preferred, especially such a film which has been biaxially oriented, typically at a temperature in the range of 70° C. to 125° C., and preferably heat set, typically at a temperature in the range of 150° C. to 250° C., for example as described in British Patent 838,708.

The polyester film prepared from the composition according to the present invention may be uniaxially or biaxially oriented, but is preferably biaxially oriented by drawing in two mutually perpendicular directions in the plane of the film to achieve a satisfactory combination of mechanical and physical properties. Preferably, the film is biaxially oriented by sequential stretching in two mutually perpendicular directions, typically at a temperature in the range of 70° C. to 150° C. Such stretching is described in many patents, including British Patent No. 838,708. These techniques are well known to those skilled in the polyester film manufacture art.

The polyester film of the present invention is typically formed in a thickness not exceeding 175 microns, more typically not exceeding 100 microns, preferably not exceeding 50 microns, most preferably in a range between 9 and 25 microns.

A conventional coating medium may optionally be applied to one or both surfaces of the polyester film of this invention. Such coatings are customarily added to improve the adhesive or anti-static properties. The chemical compositions of these coatings are well known to those skilled in the art and are described in numerous patents and publications. The coating medium may be applied to an uniaxially oriented or a biaxially oriented film substrate. In a simultaneous biaxially oriented stretching process, the coating medium is suitably applied to the substrate either before commencement or after conclusion of the stretching operation. In a sequential biaxially oriented stretching process, preferably the coating medium is applied to the film substrate between the two stretching stages i.e. between the longitudinal and transverse stretchings of a biaxial stretching operation. Such a sequence of stretching and coating is especially preferred for the production of a coated polyethylene terephthalate film. Preferably the film is first stretched in the longitudinal direction over a series of rotating rollers, then coated with the coating medium, and lastly stretched transversely in a stenter oven, preferably followed by heat setting of the coated film.

The optional coating medium may be applied to the polyester film as an aqueous dispersion or solution in an organic solvent by any suitable conventional coating technique such as by dip coating, bead coating, gravure, reverse roller coating or slot coating.

The temperatures applied to the coated film during the subsequent stretching and/or heat setting are effective in drying the aqueous medium, or the solvent in the case of solvent-applied compositions, and also in coalescing and forming the coating into a continuous and uniform layer.

The optional coating layer may be applied to one or both surfaces of the polyester substrate, and one or both coating layers may be subjected to coating with additional material. The function of the coating layer may thus be as a primer layer to aid the subsequent deposition of additional coating layer(s) or as a coating to provide improved handling properties to the film.

The one or more polymeric layers of the polyester film substrate and any optional coating layers used to form a composition may conveniently contain any of the additives conventionally employed in the manufacture of thermoplastics polyester films. Thus, such agent as dyes, pigments, voiding agents, lubricants, anti-oxidants, anti-blocking agents, surface active agents, slip aids, gloss-improvers, prodegradants, ultra-violet light stabilizers, viscosity modifiers, dispersion stabilizers, fillers and filler combinations may be incorporated in the polyester film substrate and/or coating layer(s), as appropriate.

The invention can be better understood by referring to the following specific examples which teach several embodiments of this invention.

EXAMPLES

In these Examples, the following materials and test procedures were employed:

Glass spheres particle size of 2.0 - SPHERIGLASS E250P2BH sold by Potters Industries, Inc. having average particle size of 2.0 microns, as measured on a Microtrac Model II - Particle Size Analyzer and a particle size distribution of 99.9 percent below 8 microns, 75 percent below 5 microns and 50 percent below 2.0 microns.

Glass spheres particle size of 3.8 - SPHERIGLASS E250P2BH sold by Potters Industries, Inc. having average particle size of 3.8 microns, as measured on a Microtrac Model II - Particle Size Analyzer and a particle size distribution of 99.9 percent below 10 microns, 75 percent below 6 microns and 50 percent below 3.8 microns.

Glass spheres particle size of 5.2 - SPHERIGLASS P6 supplied by Potters Industries, Inc. having average particle size of 5.2 microns, as measured on a Microtrac Model II - Particle Size Analyzer. Filler concentration: are given in parts per million by weight of polymer.

Filler Concentration: all filler concentrations are given in parts per million by weight based on the weight of the polymer, unless otherwise specified.

Average Particle Size: all average particle sizes are in microns as measured on a Microtrac Model II - Particle Size Analyzer.

Haze %: was measured by a Gardner Hazemeter.

MD rating: is an evaluation of the films winding quality, by high speed winding a minimum of 15,000 feet of the film onto a core at a line speed of about 1800 feet/min. and evaluating the quality of the film by measuring, in inches, the width of the raised film lines and dividing the total of such lines by the total width of the film and normalizing to a range of from 1 to 10 with 1 representing 0 visible lines.

Speckle Rating: is an evaluation of the optical quality of the film surface, by observing the reflective distortion of light reflective from a metallized surface of the film with a rating of 1 representing virtually no speckles.

EXAMPLE 1

About 2040 kg of ethylene glycol was introduced into a 3000 kilogram high shear mixer, sold by Ross Inc. Then under agitation the following was added: about 646.6 kg calcined clay slurry about 51% solids in ethylene glycol, sold by English China Clay International under the trade name InFilm 3117, having an average particle size of about 0.3 microns as measured on a Microtrac Model II - Particle Size Analyzer, having a particle size distribution of 98% below 2 microns and 90% below 0.5 microns; and about 30.28 kg of glass spheres having an average particle size of 3.8 microns, such that the final film product would comprise about 275 ppm, based on the weight of the polymer, of the glass spheres and about 3000 ppm, based on the weight of the polymer, of calcined clay. In a separate vessel about 2100 liters of dimethyl terephthalate (DMT) was reacted at about 220° C. with about 1260 liters of ethylene glycol to form bishydroxyethylene terephthalate (monomer). After the mixed filler slurry had been mixed for about 1 hour it was then pumped into the monomer while the monomer was continually agitated. The temperature of the monomer composition was then elevated to about 240° C. and continually agitated until substantially all the excess ethylene glycol was removed, approximately 10 minutes.

After the monomer/mixed filler composition was then transferred to a conventional autoclave, the molten monomer was polymerized at about 285°–290° C. at a pressure of about 0.4 millimeters of mercury under agitation. The resulting polyethylene terephthalate was cooled to about room temperature and converted to chips using a conventional pelletizer.

The dried chips were then extruded using conventional film manufacturing equipment at about 285° C. into film and then biaxially oriented by stretching in sequence, using conventional equipment, in mutually perpendicular directions at a draw ratio of about 3.1:1 in each direction followed by heat setting at about 220° C. The resulting filled film product had a total thickness of about 12 microns and haze quality of about 3.6% as measured by the Gardner Hazemeter. In addition to good optical clarity, the film was also evaluated for its winding quality by high speed winding an excess of 20,000 feet of film onto a core at a line speed of about 1800 feet/min. and evaluating the quality of the film by visually inspecting the external surface of the rolled film to observe that virtually no blocking pimples, no MD wrinkles or creases were present. In addition, the film achieved a speckle rating of about 5 which was determined by metallizing an about 8.5. by about 11 inch sample of the film and noting the amount of distortion in the light reflecting off the metallized surface.

EXAMPLES 2–7

Examples 2–7 were prepared by the procedure of Example 1 with the quantities and particle sizes of the fillers being varied as summarized in Table 1. Table 1 also gives the results of the evaluation of these filled films for percent haze, machine direction line rating and speckle rating.

TABLE 1

| EX. | FILLERS | FILLER CONC. (ppm) | AVERAGE PARTICLE SIZE (μm) | HAZE % | MD RATING | SPECKLE RATING |
| --- | --- | --- | --- | --- | --- | --- |
| 2 | Glass Spheres | 25 | 3.8 | 4.2 | 4 | 5 |
|   | Calcined Clay | 4800 | 0.3 |   |   |   |
| 3 | Glass Spheres | 125 | 3.8 | 2.7 | 5 | 6 |
|   | Calcined Clay | 2400 | 0.3 |   |   |   |
| 4 | Glass Spheres | 125 | 3.8 | 3.4 | 5 | 6 |
|   | Calcined Clay | 3400 | 0.3 |   |   |   |
| 5 | Glass Spheres | 250 | 3.8 | 3.2 | 1 | 6 |
|   | Calcined Clay | 3000 | 0.3 |   |   |   |
| 6 | Glass Spheres | 50 | 5.2 | 2.3 | 7 | 6 |
|   | Calcined Clay | 2400 | 0.3 |   |   |   |
| 7 | Glass Spheres | 200 | 2.0 | 3.0 | 8 | 6 |
|   | Calcined Clay | 2400 | 0.3 |   |   |   |

What is claimed is:

1. A polyester film comprising a polyester polymer having incorporated therein a combination of (a) solid glass spheres having an average particle size of between 1 and 8 microns present in an amount ranging between 25 ppm and 350 ppm by weight based on the weight of the polymer and (b) calcined clay having an average particle size of less than 1 micron present in an amount not exceeding 10,000 ppm by weight based on the weight of the polymer.

2. The film of claim 1 wherein the calcined clay is present in amount of less than 8,000 ppm by weight based on the weight of the polymer.

3. The film of claim 2 wherein the calcined clay is present in an amount of from 1000 to 5000 ppm.

4. The film of claim 1 wherein the glass spheres have an average particle size ranging between 2 and 5.2 microns.

5. The film of claim 4 wherein the glass spheres are present in an amount ranging between 50 and 300 ppm by weight, based on the weight of the polymer.

6. The film of claim 5 wherein the glass spheres are present in an amount of from 100 to 300 ppm.

7. The film of claim 4 wherein the glass spheres have an average particle size ranging from 2 to 4 microns.

8. The film of claim 1 wherein the thickness of the film is less than 50 microns.

9. The film of claim 1 wherein the polyester film is polyethylene terephthalate.

10. The film of claim 1 wherein the calcined clay has an average particle size of less than 0.85 microns.

11. The film of claim 10 wherein the calcined clay has an average particle size of from 0.25 to 0.75 microns.

12. The film of claim 11 wherein the calcined clay has an average particle size of 0.3 microns and a particle size distribution of 98% below 2 microns and 90% below 0.5 microns.

13. A polyester film comprising a polyethylene terephthalate polymer having incorporated therein a combination of (a) solid glass spheres having an average particle size of between 2.0 and 4.0 microns and present in an amount ranging between 100 and 300 ppm by weight based on the weight of polymer, and (b) a calcined clay having an average particle size of between 0.25 and 0.75 microns and present in a range of between 1,000 and 5,000 ppm by weight based on the weight of polymer.

14. The film of claim 13 wherein the calcined clay has an average particle size of 0.3 microns having a particle size distribution of 98% below 2 microns and 90% below 0.5 microns.

15. A polyester film comprising a polyester polymer having incorporated therein a combination of (a) solid glass spheres having an average particle size of between 1 and 8 microns present in an amount ranging between 30 ppm and 350 ppm by weight based on the weight of the polymer and (b) calcined clay having an average particle size of less than 1 micron present in an amount not exceeding 10,000 ppm by weight based on the weight of the polymer, having one or both surfaces of said film coated with a coating layer.

* * * * *